G. J. GUTH.
LID.
APPLICATION FILED JUNE 21, 1916.
1,215,929. Patented Feb. 13, 1917.
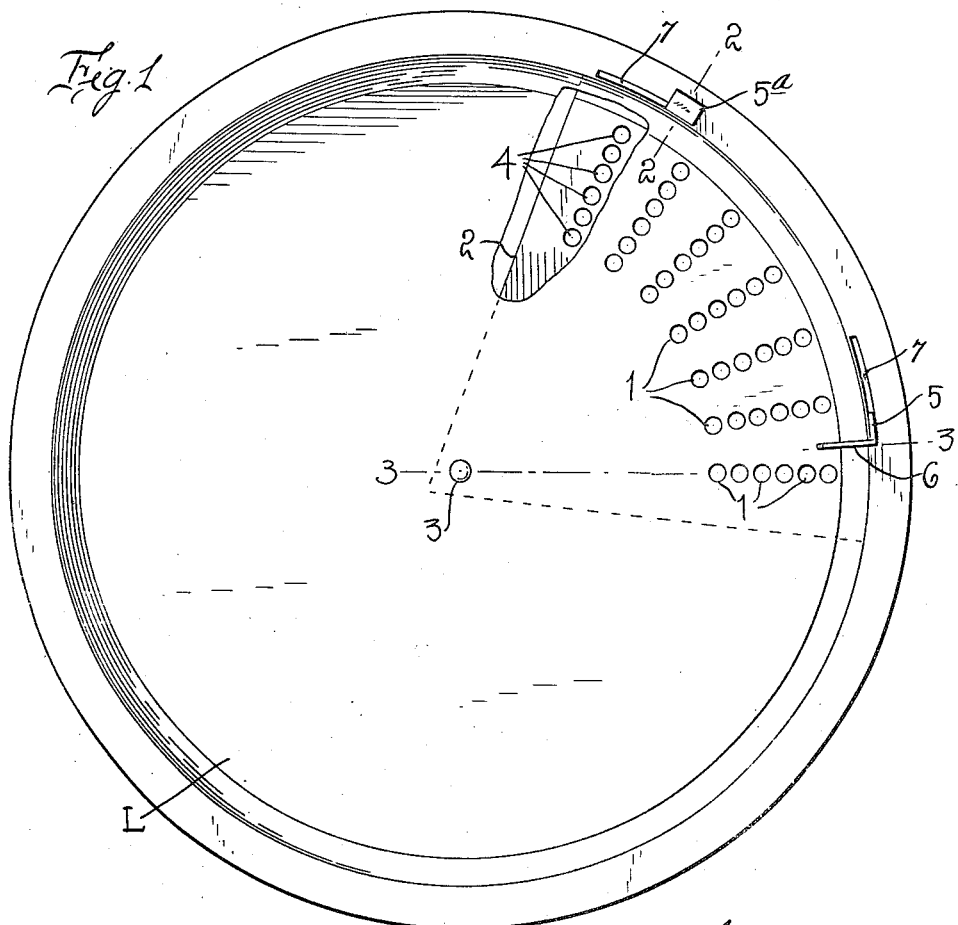
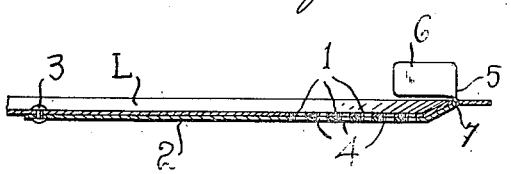
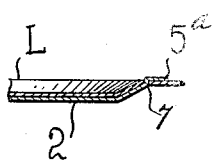
Inventor
GEORGE J. GUTH
By Watson E. Coleman
Attorney

UNITED STATES PATENT OFFICE.

GEORGE JACOB GUTH, OF DENVER MILLS, COLORADO.

LID.

1,215,929.

Specification of Letters Patent.

Patented Feb. 13, 1917.

Application filed June 21, 1916. Serial No. 104,953.

*To all whom it may concern:*

Be it known that I, GEORGE J. GUTH, a citizen of the United States, residing at Denver Mills, in the county of Denver and State of Colorado, have invented certain new and useful Improvements in Lids, of which the following is a specification, reference being had to the accompanying drawings.

This invention relates to certain improvements in lids and has relation more particularly to a device of this general character especially designed and adapted for use in connection with domestic cooking vessels; and it is an object of the invention to provide a lid with novel and improved means whereby the same may be conveniently used for draining or to permit the escape of steam when the lid is in applied position during a cooking operation.

The invention consists in the details of construction and in the combination and arrangement of the several parts of my improved lid whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in top plan with a portion broken away of a lid constructed in accordance with an embodiment of my invention;

Fig. 2 is a sectional view taken substantially on the line 2—2 of Fig. 1; and

Fig. 3 is a sectional view taken substantially on the line 3—3 of Fig. 1.

As disclosed in the accompanying drawings, L denotes a lid of conventional form and which is provided adjacent its margin with a series of perforations 1.

2 denotes a sector plate substantially in the form of a quadrant which is pivotally engaged adjacent its apex, as at 3, with the lid L and having its curved marginal portion terminating inwardly of the marginal portion of the lid L so that the plate may be readily adjusted when in applied position. The plate 2 is provided with a series of openings 4 adapted to register with the perforations 1 of the lid L when at the limit of its movement in one direction and the openings 4 are so arranged that the plate 2 serves to close the perforations 1 when at the limit of its movement in an opposite direction.

The marginal portion of the plate 2 adjacent its ends is provided with the upstanding tongues 5 and $5^a$ extending through suitable slots 7 produced in the marginal portion of the lid L, said extension 5 being vertically disposed throughout its length and being provided with an inwardly directed wing 6 whereby the requisite sliding movement may be imparted to the plate 2. The wing 6 is arranged at a vertical edge of the tongue and extends substantially at right angles therefrom. It will be noted that the tongues 5 and $5^a$ serve to hold the outer marginal portion of the plate 2 against separating movement relative to the lid L.

From the foregoing description, it is thought to be obvious that a lid constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. In combination with a lid provided with slots adjacent its marginal portion and having a plurality of openings, a sector plate underlying the lid and having its apex portion pivotally engaged with the lid, the opposite end portion of the plate being provided with tongues disposed through the slots of the lid, said plate being provided with openings adapted to register with the openings of the lid upon movement of the plate in one direction, one of the tongues being vertically disposed throughout its length and provided with an inwardly directed wing, said wing being positioned along a vertical edge of said tongue and at substantially right angles thereto.

2. In combination with a lid provided with slots adjacent its marginal portion and having a plurality of openings, a sector plate underlying the lid and having its apex portion pivotally engaged with the lid, the opposite end portion of the plate being provided with tongues disposed through the slots of the lid, said plate being provided with openings adapted to register with the openings of the lid upon movement of the plate in one direction, one of the tongues being vertically disposed throughout its length and provided with an inwardly directed wing.

In testimony whereof I hereunto affix my signature in the presence of two witnesses.

GEORGE JACOB GUTH.

Witnesses:
JOSEPH P. HORNE,
ALFRED J. HALL.